(12) United States Patent
Edwards et al.

(10) Patent No.: US 8,960,599 B2
(45) Date of Patent: Feb. 24, 2015

(54) AEROSPACE VEHICLE YAW GENERATING TAIL SECTION

(75) Inventors: Huw L. Edwards, Derby (GB); Stephen M. Husband, Derby (GB); Paul Fletcher, Rugby (GB)

(73) Assignee: Rolls-Royce PLC, London (GB)

( * ) Notice: Subject to any disclaimer, the term of this patent is extended or adjusted under 35 U.S.C. 154(b) by 514 days.

(21) Appl. No.: 13/176,516

(22) Filed: Jul. 5, 2011

(65) Prior Publication Data

US 2012/0025013 A1    Feb. 2, 2012

(30) Foreign Application Priority Data

Jul. 29, 2010 (GB) .................................... 1012675.3

(51) Int. Cl.
*B64C 15/00* (2006.01)
*B64C 5/06* (2006.01)

(52) U.S. Cl.
CPC .. *B64C 5/06* (2013.01); *B64C 15/00* (2013.01)
USPC ................................ 244/87; 244/55; 244/207

(58) Field of Classification Search
CPC ............ B64C 27/82; B64C 2027/8245; B64C 2027/8254
USPC .................. 244/58, 53 B, 87, 17.19, 207, 55; 114/23, 67 A, 162; 440/37, 43; 446/34, 446/35, 61, 63, 66
See application file for complete search history.

(56) References Cited

U.S. PATENT DOCUMENTS

| | | | | |
|---|---|---|---|---|
| 3,807,662 A | * | 4/1974 | Velazquez ................... | 244/17.19 |
| 3,807,665 A | * | 4/1974 | Coombe ......................... | 244/55 |
| 3,957,226 A | * | 5/1976 | Daggett et al. ............. | 244/17.19 |
| 4,116,405 A | * | 9/1978 | Bacchi et al. ................ | 244/12.4 |
| 4,200,252 A | * | 4/1980 | Logan et al. ............... | 244/17.19 |
| 4,421,489 A | * | 12/1983 | Van Veldhuizen ............. | 440/37 |
| 4,660,785 A | * | 4/1987 | Munski ....................... | 244/17.19 |
| 4,825,375 A | * | 4/1989 | Nadkarni et al. ................ | 701/3 |
| 4,948,068 A | * | 8/1990 | VanHorn .................... | 244/17.19 |
| 5,007,495 A | * | 4/1991 | Yoshida et al. ........... | 244/110 B |
| 5,131,603 A | * | 7/1992 | Meyers ...................... | 244/17.19 |
| 5,131,605 A | * | 7/1992 | Kress ............................. | 244/56 |
| 5,212,419 A | * | 5/1993 | Fisher et al. .......... | 310/216.061 |
| 5,240,205 A | * | 8/1993 | Allongue ................... | 244/17.19 |
| 5,277,381 A | * | 1/1994 | Piasecki .................... | 244/17.19 |
| 5,522,470 A | * | 6/1996 | Stiegler et al. ............. | 114/67 A |
| 5,526,764 A | * | 6/1996 | Jacobson ........................ | 244/36 |
| 5,649,678 A | * | 7/1997 | Nurick ...................... | 244/17.19 |

(Continued)

FOREIGN PATENT DOCUMENTS

| | | |
|---|---|---|
| EP | 1 759 988 A2 | 3/2007 |
| GB | 2 432 348 A | 5/2007 |

OTHER PUBLICATIONS

British Search Report issued in Application No. GB1012675.3 dated Oct. 13, 2010.

*Primary Examiner* — Joseph W Sanderson
*Assistant Examiner* — Marc Burgess
(74) *Attorney, Agent, or Firm* — Oliff PLC

(57) ABSTRACT

A tail section for an aerospace vehicle is provided. The tail section comprises a rudder which is movable about an axis to generate a yawing moment on the aerospace vehicle. The tail section further comprises a thruster having, in flow series, an air intake, an electrically powered device for accelerating the air received through the intake, and an air outlet which directs the accelerated air to increase the yawing moment generated by the rudder.

11 Claims, 5 Drawing Sheets

(56) References Cited

U.S. PATENT DOCUMENTS

| | | | |
|---|---|---|---|
| 5,687,561 A * | 11/1997 | Newton | 60/226.1 |
| 5,697,394 A * | 12/1997 | Smith et al. | 244/53 B |
| 5,738,301 A * | 4/1998 | Francois et al. | 244/17.19 |
| 6,014,940 A * | 1/2000 | Jacobson | 244/12.1 |
| 6,416,015 B1 * | 7/2002 | Carson | 244/17.19 |
| 6,575,402 B1 * | 6/2003 | Scott | 244/12.2 |
| 6,755,374 B1 * | 6/2004 | Carson | 244/17.19 |
| 6,905,380 B1 * | 6/2005 | Varga | 440/37 |
| 7,032,860 B1 * | 4/2006 | Kirk et al. | 244/17.19 |
| 7,364,115 B2 * | 4/2008 | Parks et al. | 244/12.4 |
| 7,438,259 B1 * | 10/2008 | Piasecki et al. | 244/6 |
| 8,516,785 B2 * | 8/2013 | Brown | 244/53 B |
| 8,561,938 B2 * | 10/2013 | Dickman | 244/17.19 |
| 2006/0284022 A1 | 12/2006 | Harrigan et al. | |
| 2007/0028594 A1 * | 2/2007 | Arata | 60/224 |
| 2007/0272795 A1 * | 11/2007 | Ellnor | 244/45 A |
| 2009/0216392 A1 * | 8/2009 | Piasecki et al. | 244/17.19 |
| 2011/0121128 A1 * | 5/2011 | Balkus, Jr. | 244/17.21 |
| 2012/0104154 A1 * | 5/2012 | Yarger | 244/17.13 |

\* cited by examiner

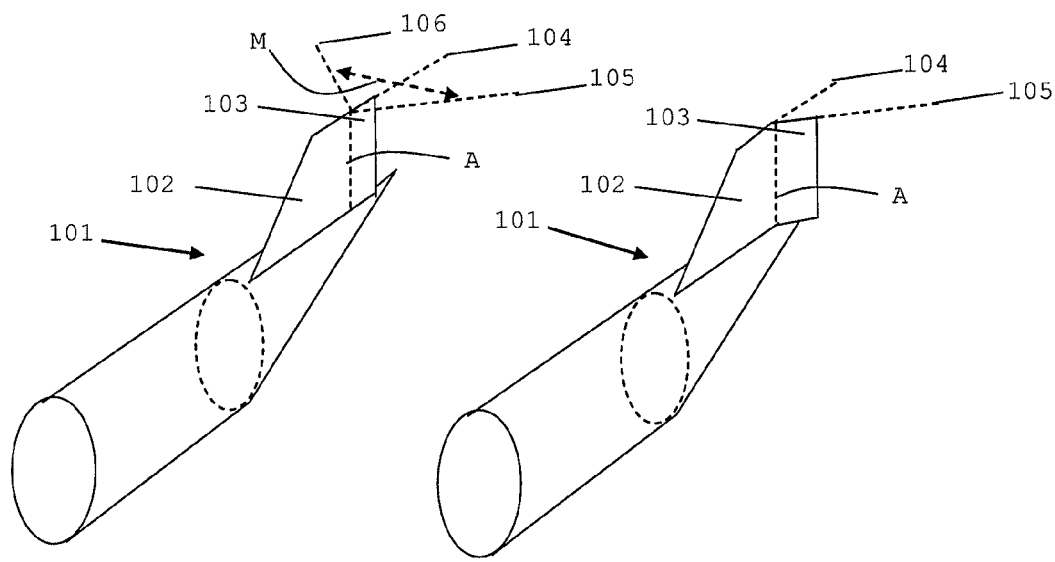
Figure 1 (a)
Related Art
Figure 1 (b)
Related Art
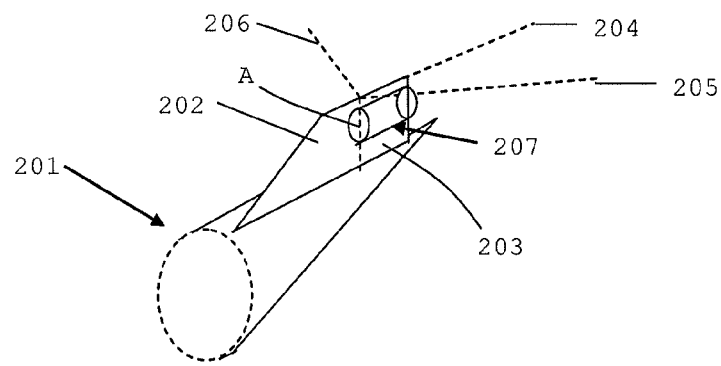
Figure 2

AEROSPACE VEHICLE YAW GENERATING TAIL SECTION

FIELD OF THE INVENTION

The present invention relates to a yaw generating tail section for an aerospace vehicle.

BACKGROUND OF THE INVENTION

Most aircraft include a tail section with a rudder which provides yaw control. The size of the rudder and the power of the actuators needed to move the rudder are typically determined by the magnitude of the yawing moment that must be produced to control the aircraft in the event of loss of power of an engine. That is, the rudder must be able to correct the yaw instability created by the remaining engines. The rudder creates an appropriate yaw force to ensure that the aircraft remains in a suitable orientation. Aircraft control under normal operating conditions typically requires much smaller yawing moments.

Thus a relatively large tail fin is typically adopted in conventional aircraft configurations, the size of the tail fin being determined by the requirement for a relatively large rudder which can provide aircraft control in emergency situations, such as the loss of an engine. However, the large fin causes significant drag and increases aircraft weight throughout flight despite that the full size of the fin is only needed in emergencies.

US patent 2006284022 proposes alternative methods for creating yaw, for example, using a spoiler surface to generate a low pressure area on a fuselage of an aircraft.

SUMMARY OF THE INVENTION

It would be desirable to provide a tail section for an aerospace vehicle that produces less drag than a conventional tail section eg by having a smaller fin, but which can nonetheless generate a sufficient yawing moment in emergency situations. Accordingly, a first aspect of the present invention provides a tail section for an aerospace vehicle, the tail section comprising:

a rudder which is movable about an axis to generate a yawing moment on the aerospace vehicle, and a thruster having, in flow series, an air intake, an electrically powered device for accelerating the air received through the intake, and an air outlet which directs the accelerated air to increase the yawing moment generated by the rudder.

Thus both the rudder and the thruster can contribute to generation of a yawing moment. Typically, the rudder can be sized to provide a sufficient yawing moment under normal operating conditions, while the thruster provides an additional yawing moment during emergency situations. In this way, the tail section can be reduced in size, eg by having a smaller fin, which in turn can lead to decreased levels of drag.

The tail section may have any one or, to the extent that they are compatible, any combination of the following optional features.

Typically the tail section has a fin which comprises the rudder.

Preferably, the thruster is mounted to a stationary section of the fin forward of the rudder, such that the accelerated air impinges on the rudder. In particular, the accelerated air can be directed to flow over the rudder, which, when at an angle relative to the axis, will produce a yaw force on the aerospace vehicle.

Alternatively the thruster may be movable about the axis with the rudder. For example, the thruster can be carried by the rudder, eg by being embedded or incorporated within the rudder. In this way, when the rudder the moves, the direction of the air outlet also changes so that the yawing moment generated by the thruster supplements the yawing moment generated by the rudder. Typically, the air outlet directs the accelerated air rearwards from a trailing edge of the rudder.

In such arrangements, the air received by the intake, which is typically forward of the air outlet, eg at or forward of the leading edge of the rudder, can impose a drag penalty. Thus preferably, the air intake has a movable cover which, when closed, presents an aerodynamic surface preventing air from entering the thruster, and which, when open, allows air to enter the thruster. The cover can reduce the amount of drag when the thruster is not in use.

In another arrangement, however, the thruster may be transversely mounted across the tail section such that the air intake and the air outlet are at opposite sides of the tail section. The electrically powered device may be then be operably reversible such that the roles of the air intake and the air outlet are exchangeable, ie in one direction of operation of the electrically powered device, air is received from the port side of the aerospace vehicle through a first dual-function intake/outlet and is ejected from the starboard side of the vehicle through a second dual-function intake/outlet, and in the reverse direction of operation of the electrically powered device, the air is received from the starboard side of the aerospace vehicle through the second dual-function intake/outlet and is ejected from the port side of the vehicle through the first dual-function intake/outlet.

In such an arrangement, typically the thruster is fixed relative to the aerospace vehicle, ie it does not move with the rudder. Conveniently, the thruster may be mounted in a stationary portion of the tail section, eg in the rear of the fuselage, adjacent the rudder.

In another arrangement, the electrical thruster may be mounted to the tail section, with two outlets on respective sides of the aerospace vehicle. The electrically powered device can feed both outlets, but typically only one of the outlets is fed at any one time. In this arrangement, the accelerated air can be directed down the side of the vehicle, producing a faster stream of air on that side, which in turn produces a yawing force via the Coanda effect. The direction of the force can then be reversed by using the outlet on the other side of the vehicle. In yet another arrangement, two thrusters could be mounted to respective sides of the tail section, typically only one of the thrusters being fed at any one time. Again, the, or each, thruster may be mounted in a stationary portion of the tail section, eg in the rear of the fuselage, adjacent the rudder. However, where two thrusters are mounted to respective sides of the tail section, these can be mounted eg to respective laterally extending fins at respective sides of the tail section. The yawing force may then be generated predominantly by thrust produced by the thrusters rather than by the Coanda effect.

Preferably, the air outlet is formed as a nozzle eg to reduce noise or to affect the efficiency of the thruster. This nozzle can be tapered to accelerate the air flow through nozzle. An ejector nozzle can be used to increase the mass flow from the thruster.

Typically, the electrically powered device includes one or more fans for accelerating the air. When a plurality of fans is adopted, these may be arranged in series or in parallel with each other. Indeed, series fans may be arranged in parallel with other series fans. Such configurations can provide redundancy in the event of failure of one of the fans. A series configuration can facilitate higher thrusts, for a given cross sectional area of the fans in the thruster. A parallel configuration can facilitate high thruster efficiencies, although a greater surface cross sectional area of the fans may be required for a given thrust. The fans may be arranged to contra rotate with respect to each other to reduce swirl and gyroscopic effects.

The, or each, fan can be hub driven. Preferably, however, the, or each, fan is rim driven as this can produce less obstruction to air flow through the thruster.

The power for the thruster may be provided by any suitable onboard electrical power supply, such as generator(s) on the main engine(s) (eg gas turbine engines) of the aerospace vehicle, a generator on an auxiliary power unit, local energy storage (eg batteries), or an onboard fuel cell.

Preferably, the thruster is adapted to operate as a ram air turbine to produce power for the aerospace vehicle when not being used to generate thrust. The thruster can thus replace a conventional ram air turbine on the aerospace vehicle, reducing any net weight gain which might be imposed by adopting the tail section of this aspect of the invention. The thruster can be used as a ram air turbine in the event of failure of the main engine(s) and/or failure of generator(s) on the main engine(s).

A second aspect of the present invention provides an aerospace vehicle having the tail section of the first aspect.

A third aspect of the present invention provides a method of operating the aerospace vehicle according to the second aspect, the method comprising:
  generating a yawing moment on the aerospace vehicle under normal operating conditions by moving the rudder; and
  generating a larger yawing moment on the aerospace vehicle under emergency situations by moving the rudder and operating the thruster to generate thrust.
The method may further comprise:
  using the thruster as a ram air turbine to produce power for the aerospace vehicle when the thruster is not being used to generate thrust.

BRIEF DESCRIPTION OF THE DRAWINGS

Embodiments of the invention will now be described by way of example with reference to the accompanying drawings in which:

FIGS. 1(a) and (b) show schematically an example of a conventional aircraft tail section;

FIG. 2 shows schematically a first embodiment of an aircraft tail section according to the present invention;

DETAILED DESCRIPTION

Figure 3:
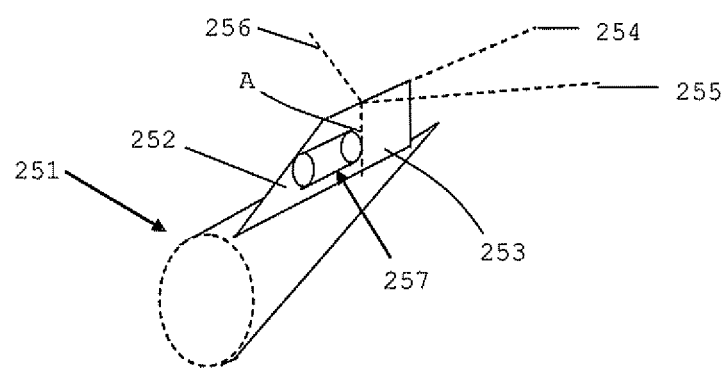
FIG. 3 shows schematically a second embodiment of an aircraft tail section according to the present invention.

FIGS. 1(a) and (b) show schematically an example of a conventional aircraft tail section 101 having an upwardly extending fin 102. Typically, the tail section would also have two laterally extending fins at the respective sides of the section, but these are not shown in FIGS. 1(a) and (b). The rear part of the fin is formed by a rudder 103, which can be moved M through a range of angles about an upwardly extending axis A away from its in-plane position 104 (FIG. 1(a)) with the rest of the fin. The movement for generating yaw towards starboard is limited to a maximum amount 106 and the movement for generating yaw towards port (FIG. 1(b)) is limited to a maximum amount 105. The size of the rudder is determined by the conditions imposed on the aircraft when an engine stops operating. This emergency situation creates a yaw instability, and the rudder is usually deployed to correct the instability. The effect of tilting a portion of the rudder produces an increase in drag on one side of the aircraft, allowing the yaw to be controlled. However, if the size of the rudder, and hence the size of the fin, could be reduced while still providing this emergency yaw control, there would be a significant efficiency gain for the aircraft through the reduced drag of the fin.

FIG. 2 shows schematically a first embodiment of an aircraft tail section 201 according to the present invention. Again, the tail section has an upwardly extending fin 202, with the rear part of the fin being formed by a rudder 203, which can be moved through a range of angles about an upwardly extending axis A away from its in-plane position 204 with the rest of the fin up to maximum amounts to port 205 and to starboard 206. However, the fin and rudder are smaller than those of the conventional tail section 101. Further, a thruster 207 is embedded in the rudder.

As discussed in more detail below, the thruster 207 comprises, in flow series (ie from front to rear), an air intake, an electrically powered device for accelerating the air received through the intake, and an air outlet which directs the accelerated air rearward at the trailing edge of the rudder to generate thrust. The outlet can have a smaller area than the intake to increase the pressure of the accelerated air. Typically, the outlet is formed as a nozzle to reduce noise and/or to improve efficiency. An ejector nozzle could also be added to increase mass flow.

Because the thruster 207 is embedded into the rudder 203, as the angle of the rudder changes so also does the direction of the generated thrust in such a way as to increase the yawing moment generated by the rudder. That is, as the rudder angle increases, the generated thrust is increasingly laterally directed, thereby supplementing the yawing moment generated by the rudder. Thus a greater overall yawing moment can be provided for a given fin size. Generally, the size of the rudder is such that the rudder alone can provide sufficient yaw control during normal aircraft operation, and the thruster is only used in emergency situations to generate the exceptional yawing moments that may then be required. However, the thruster 207 can also be used to provide yaw control under normal operating conditions, in particular where the air mass-flow across the tail section is low (eg at low speed at take off) or at lower air pressures (eg cruise). Under these circumstances, the rudder is less effective and the thruster can provide useful additional control.

FIG. 3 shows schematically a second embodiment of an aircraft tail section 251 according to the present invention, which is similar to the first embodiment. Thus the tail section has an upwardly extending fin 252, with the rear part of the fin being formed by a rudder 253, which can be moved through a range of angles about an upwardly extending axis A away from its in-plane position 254 with the rest of the fin up to maximum amounts to port 255 and to starboard 256. In this embodiment, however, a thruster 257 is embedded in the stationary forward part of the fin. Again, the thruster comprises, in flow series an air intake, an electrically powered device for accelerating the air received through the intake, and an air outlet which directs the accelerated air rearward. The accelerated air then passes over the surface of the rudder. When the rudder is angled away from its in-plane position, this passage of the accelerated air increases the yawing moment produced by the rudder.

Figure 4:
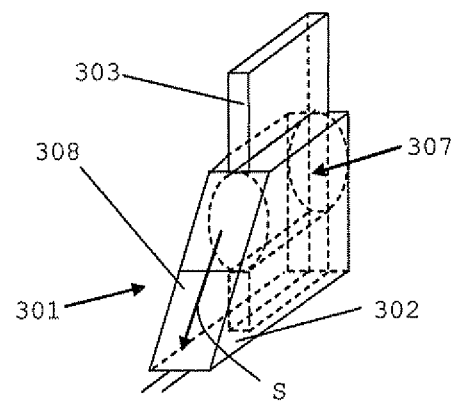
FIG. 4 shows schematically a third embodiment of an aircraft tail section according to the present invention.

FIG. 4 shows schematically a third embodiment of an aircraft tail section 301 according to the present invention having a fin 302 comprising a rudder 303, and a thruster 307 incorporated in the rudder. In the tail section 201 of FIG. 2 the intake to the thruster is open at all times, such that air can pass through the thruster causing significant drag even when the thruster is not in use. In order to reduce this drag, the tail section of FIG. 3 has an aerodynamic cover 308 with a sloped leading edge and curved surfaces which forms a portion of the leading edge of the fin. The cover is slidably movable S to close the intake to the thruster when the thruster is not in use during normal operation, preventing air from outside the cover from entering the intake. When the thruster is needed, the cover slides downwards to open the intake prior to the thruster being activated. A further movable cover (not shown) can also be provided for the air outlet.

A similar aerodynamic cover arrangement can also be adopted in an aircraft tail section like that of the second embodiment, in which the thruster is embedded in the stationary forward part of the fin.

The thruster 207, 257 307 of any of the above tail section embodiments can be connected to an emergency electrical power bus on the aircraft. Thus, should the main engines be lost, the thruster can be used as a ram air turbine to power key electrical systems. However, in the tail section of the third embodiment, the cover 308 must first be opened to allow the thruster to act as a ram air turbine.

Figure 5:
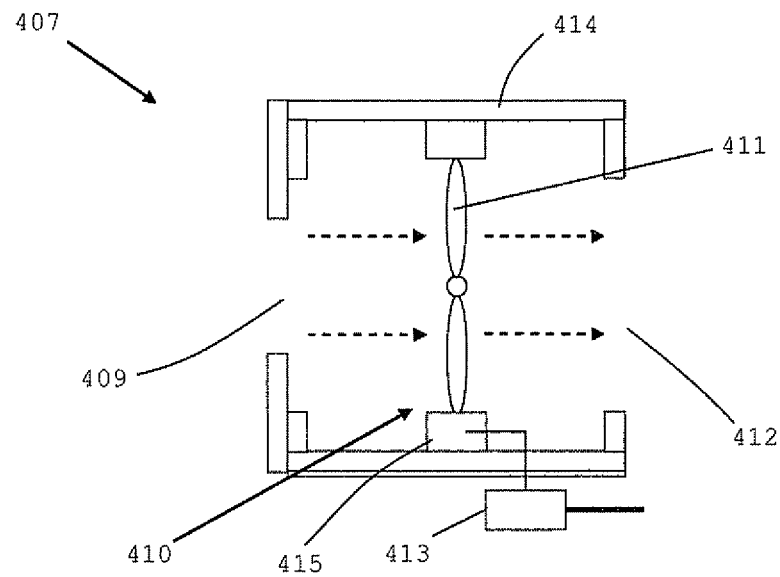
FIG. 5 shows schematically a longitudinal cross-section through a first embodiment of a thruster for use in a tail section according to the present invention.

FIG. 5 shows schematically a longitudinal cross-section through a first embodiment of a thruster 407 for use in a tail section according to the present invention. The thruster comprises, in flow series, an air intake 409, an electrically powered device 410 which is a fan having a row of fan blades 411 for accelerating the air received through the intake, and an air outlet 412 which directs the accelerated air rearward to generate thrust. The power for the fan can be provided by an onboard electrical power supply, such as the generators on gas turbine main engines, the generators on an auxiliary power unit, local energy storage (eg batteries) or an onboard fuel cell. If stored energy is used to power the thruster, the amount of power taken from the main aircraft electrical power bus can be reduced. For example, the main bus power can be used to charge the battery over a long period (eg during cruise) and the battery can provide high power over a shorter period (eg take off with one engine inoperable). This allows less heavy power cabling to be used and reduces the power off-take required for the thruster.

The power is typically supplied to a motor controller 413, which controls the input power to the fan 410. The motor 415 driven by the controller may be directly connected to the fan, or may be connected via a gearbox.

The thruster 407 has a housing 414 which contains the fan 410. The housing can contain the fan blades 411 in the event of a failure. It can also contain noise produced by the thruster and any interference produced by electromagnetic systems employed.

Figure 6:
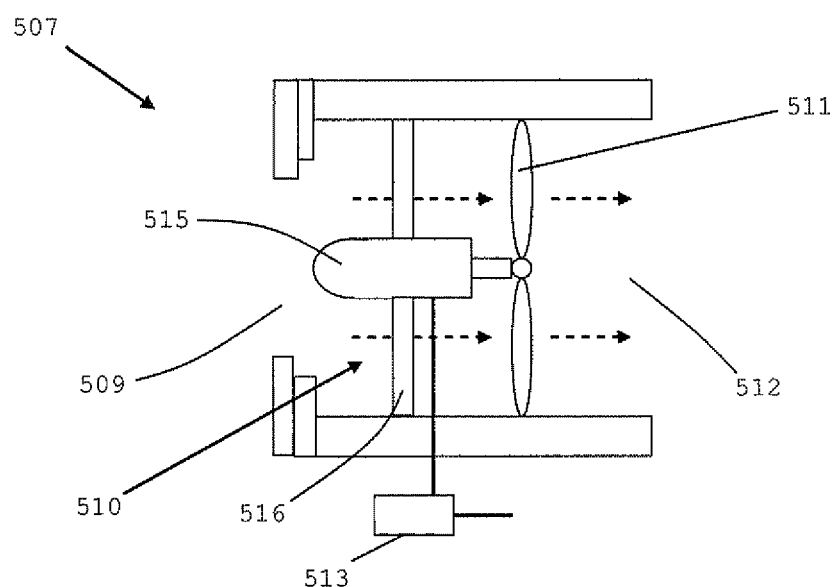
FIG. 6 shows schematically a longitudinal cross-section through a second embodiment of a thruster for use in a tail section according to the present invention.

The type of electrically powered device 410 can depend on the application. Shown in FIG. 5 is a rim driven fan 410, in which the drive is to the outer circumference of the row of fan blades 411. This arrangement has advantages of compactness and reduced obstruction to air flow through the thruster from the fan itself. FIG. 6 shows schematically a longitudinal cross-section through a second embodiment of a thruster 507 for use in a tail section according to the present invention, the thruster having an air intake 509, an electrically powered fan 510 having a row of fan blades 511 and an air outlet 512. In this embodiment, the fan is hub driven, and the fan blades are in a "pusher" configuration (although, alternatively, a "puller" configuration can be adopted). The motor hub 515 is supported by struts 516. Electrical power for the motor hub is provided by a motor controller 513. To reduce the size of the motor hub, shafts and gears can be used to transfer mechanical power from an external motor to the hub.

Figures 7A, 7B, 7C:
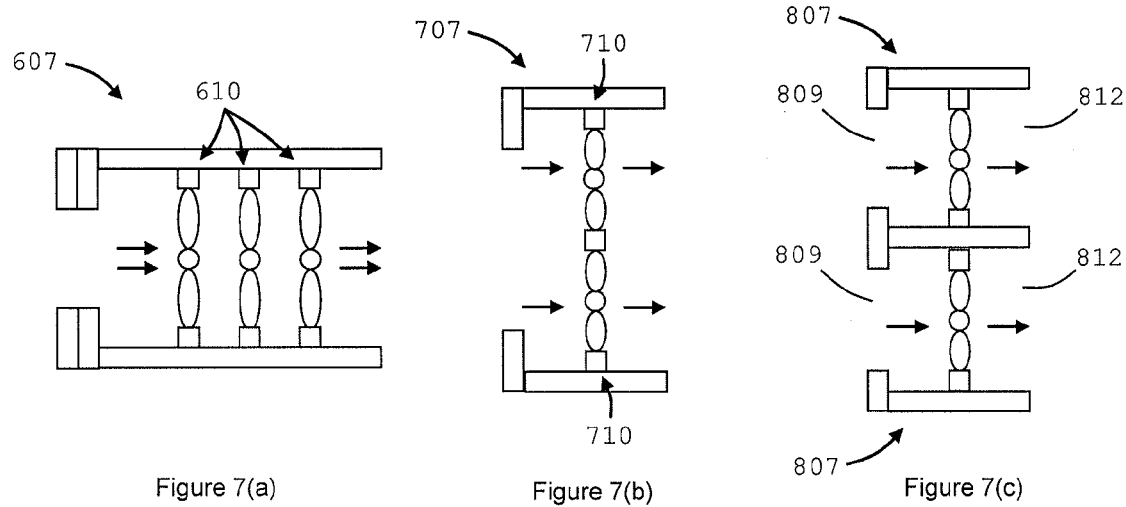
FIG. 7(a) to (c) show schematically respective longitudinal cross-sections through third, fourth and fifth embodiments of thrusters for use in tail sections according to the present invention.

FIGS. 7(a) to (c) show schematically respective longitudinal cross-sections through third, fourth and fifth embodiments of thrusters 607, 707, 807 for use in tail sections according to the present invention. In FIG. 7(a) the thruster 607 has three fans 610 in flow series, which can allow higher thrusts, for a given thruster cross sectional area, to be achieved. In FIG. 7(b) the thruster 707 has two fans 710 in parallel. In FIG. 7(c) there are two thrusters 807 in parallel, each with a respective air intake 809 and air outlet 812. By increasing the number of fans in these embodiments, redundancy is improved. Also, smaller fans can be used, which may allow the thruster to be fitted into a narrower aerodynamic housing. In addition, the fans can contra rotate with respect to each other to reduce swirl and gyroscopic effects.

The tail section typically has a control system to determine the angle of the rudder and the flow rate of accelerated air from the thruster for the given flight conditions. The control system can provide automated control, eg utilising sensors (eg for flight speed and altitude), and/or can allow manual by the pilot. The control system may allow the thruster to operate to provide supplementary thrust to the aircraft, eg when the rudder is in-plane position with the rest of the fin.

Figure 8:
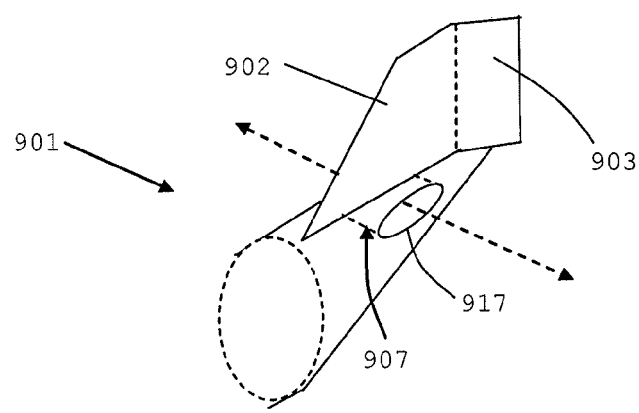
FIG. 8 shows schematically a fourth embodiment of an aircraft tail section according to the present invention.

FIG. 8 shows schematically a fourth embodiment of an aircraft tail section 901 according to the present invention having a fin 902 comprising a rudder 903, and a thruster 907. In this case, however, the thruster is not incorporated in the rudder, but rather is mounted transversely across the rear end of the fuselage below the fin. The thruster comprises a dual function air intake/air outlet 917 on the port side, and another dual function air intake/air outlet on the starboard side, and an electrically powered device (not shown) such as a fan therebetween. However, in this case, the fan is reversible. Thus when activated in one direction, the fan produces thrust in the port direction, and when rotating in the other direction, it produces thrust in the starboard direction (in FIG. 8, these thrusts are indicated by dashed arrows). This thrust again can supplement the yawing moment generated by the rudder. Advantageously, the transverse thruster creates less drag than the fin-mounted thruster, while still allowing the fin to be reduced in size. Further, it is less important to provide the intake/outlets of the transverse thruster with covers. However, the transverse thruster cannot easily be used to replace the ram air turbine.

Figure 9:
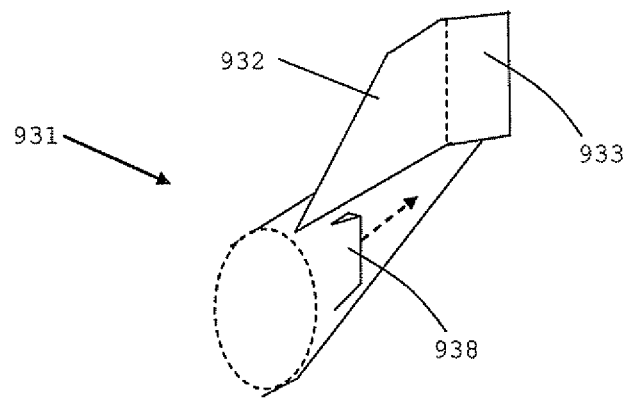
FIG. 9 shows schematically a fifth embodiment of an aircraft tail section according to the present invention.

FIG. 9 shows schematically a fifth embodiment of an aircraft tail section 931 according to the present invention having a fin 932 comprising a rudder 933, and a thruster 937. The thruster is again incorporated in the rear end of the fuselage below the fin. The thruster comprises an air intake (not shown) two air outlets 938 on either side of the fuselage, and an electrically powered device (not shown) therebetween. The output of the electrically powered device is connected to only one of the outlets at a time. The air is accelerated down the side of the aircraft from the outlet, producing a faster stream of air down that side of the aircraft. The faster air stream attracts the aircraft body to it via the Coanda effect. This produces a yawing force on the aircraft. The force can be reversed by using the outlet on the other side of the aircraft.

Figure 10:
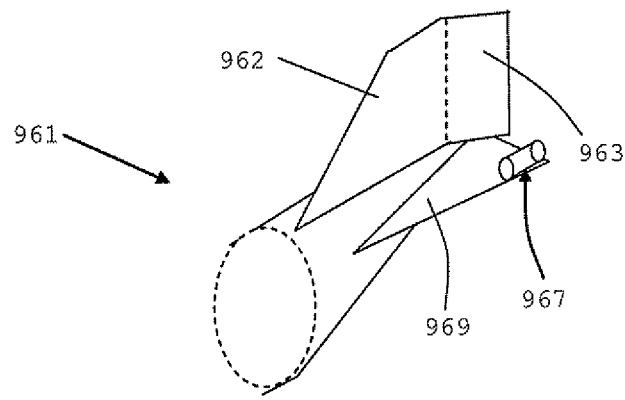
FIG. 10 shows schematically a sixth embodiment of an aircraft tail section according to the present invention.

FIG. 10 shows schematically a sixth embodiment of an aircraft tail section 961 according to the present invention having an upwardly extending fin 962 comprising a rudder 963, and two laterally extending fins 969 (only one shown in FIG. 10) at the respective sides of the section. A respective thruster 937 is mounted to the tip of each side fin. Each thruster comprises a forward air intake, a rear air outlet, and an electrically powered device therebetween. Thrust generated by the air accelerated by each thruster, develops a yaw force on the aircraft when required.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A tail section for an aerospace vehicle, the tail section comprising:
   a rudder which is movable about an axis to generate a yawing moment on the aerospace vehicle;
   a thruster having, in flow series, an air intake, an electrically powered device for accelerating the air received through the intake, and an air outlet which directs the accelerated air to increase the yawing moment generated by the rudder; and
   a controller that, in response to a determination of an engine shutdown, performs automatic control to power the electrically powered device of the thruster to increase the yawing moment to compensate for the engine shutdown,
   wherein the air intake has a movable cover which, when closed, presents an aerodynamic surface preventing air from entering the thruster, and which, when open, allows air to enter the thruster.

2. A tail section according to claim 1 wherein the tail section has a fin which comprises the rudder, and the thruster is mounted to a stationary section of the fin such that the accelerated air impinges on the rudder.

3. A tail section according to claim 1 wherein the thruster is movable about the axis with the rudder.

4. A tail section according to claim 3, wherein the air intake has a movable cover which, when closed, presents an aerodynamic surface preventing air from entering the thruster, and which, when open, allows air to enter the thruster.

5. A tail section according to claim 1, wherein the thruster is transversely mounted across the tail section such that the air intake and the air outlet are at opposite sides of the tail section, and wherein the electrically powered device is operably reversible such that the roles of the air intake and the air outlet are exchangeable.

6. A tail section according to claim 1, wherein the electrically powered device includes one or more fans for accelerating the air.

7. A tail section according to claim 6, wherein the, or each, fan is rim driven.

8. A tail section according to claim 1, wherein the thruster is adapted to operate as a ram air turbine to produce power for the aerospace vehicle when not being used to generate thrust.

9. A tail section according to claim 1, wherein the controller also automatically controls an angle of the rudder and a flow rate of the accelerated air based on flight conditions.

10. An aerospace vehicle having the tail section of claim 1.

11. A method of operating the aerospace vehicle according to claim 9, the method comprising:
   generating a yawing moment on the aerospace vehicle under normal operating conditions by moving the rudder; and
   generating a larger yawing moment on the aerospace vehicle under emergency situations by moving the rudder and operating the thruster.

\* \* \* \* \*